United States Patent

Riesch et al.

[11] Patent Number: 6,128,917
[45] Date of Patent: Oct. 10, 2000

[54] SORPTION HEAT CONVERTER SYSTEM WITH ADDITIONAL COMPONENTS

[76] Inventors: Peter Riesch, Griesfeldstrasse 23, 83646 Bad Toelz; Martin Gambs, Georg-Schwaighofer-Str. 4, 83646 Wackersberg, both of Germany

[21] Appl. No.: 09/051,089
[22] PCT Filed: Oct. 14, 1996
[86] PCT No.: PCT/DE96/01954
§ 371 Date: Apr. 14, 1998
§ 102(e) Date: Apr. 14, 1998
[87] PCT Pub. No.: WO97/14923
PCT Pub. Date: Apr. 24, 1997

[30] Foreign Application Priority Data

Oct. 14, 1995 [DE] Germany ............ 295 16 319 U

[51] Int. Cl.[7] .................................................. F25B 15/00
[52] U.S. Cl. .................... 62/476; 62/483; 62/489
[58] Field of Search ................... 62/483, 489, 476

[56] References Cited

U.S. PATENT DOCUMENTS

| | | | |
|---|---|---|---|
| 2,003,310 | 6/1935 | Rexwinkle | 62/179 |
| 2,196,911 | 4/1940 | Getaz | 62/118 |
| 3,296,814 | 1/1967 | Lynch et al. | 62/112 |
| 3,316,727 | 5/1967 | Bourne | 62/101 |
| 4,164,128 | 8/1979 | Newton | 62/105 |
| 4,413,479 | 11/1983 | Rojey | 62/101 |
| 4,503,682 | 3/1985 | Rosenblatt | 60/671 |
| 4,986,079 | 1/1991 | Koseki et al. | 62/59 |
| 5,016,445 | 5/1991 | Wehr | 62/101 |
| 5,157,942 | 10/1992 | Dao | 62/476 |
| 5,282,507 | 2/1994 | Tongu et al. | 165/165 |

FOREIGN PATENT DOCUMENTS 960 996  3/1957  Germany .

Primary Examiner—Henry Bennett
Assistant Examiner—Mark Shulman
Attorney, Agent, or Firm—Wood, Herron & Evans, L.L.P.

[57] ABSTRACT

A heat absorption conversion system which, as a single- or multistage system for providing heat and/or refrigeration, has at least one absorber and/or resorber constructed as an absorption heat exchanger. Loads per unit area for mass transfer and heat exchange and the heat transfer coefficient resulting therefrom in the absorber and/or resorber are set to a value as high as possible. To achieve this performance, the heat absorption conversion system has at least one cooled (i.e. nonadiabotic) absorption heat exchanger as the absorber and/or resorber with, as additional components, at least one solution cooler and a pump. These components, together with the absorption heat exchanger, a connection line and a control valve, form a recirculation circuit. This heat absorption conversion system operates even at low heat input temperatures or decreased refrigeration temperatures or elevated cooling medium temperatures.

15 Claims, 7 Drawing Sheets

SORPTION HEAT CONVERTER SYSTEM WITH ADDITIONAL COMPONENTS

BACKGROUND OF THE INVENTION

The invention relates to a heat absorption conversion system, termed sorption system for short below, which is used in single- or multistage designs as a refrigeration machine, heat pump and heat transformer or combinations of these for the generation of cold and/or heat (G. Alefeld, R. Radermacher: Heat Conversion Systems, CRC Press, Boca Raton (1994)). Heat absorption conversion systems are also described in Niebergall, W: Handbuch der Kältetechnik [Refrigeration Engineering Manual], Volume 7, Sorptionsk ältemaschinen [Sorption Refrigeration Machines], Springer Berlin N.Y., reprint (1981), and in H. v. Cube, F. Steimle: W ärmepumpen [heat pumps], VDI-Verlag Düsseldorf (1984). A critical factor for performance data of the sorption system is the sum of all reciprocal heat transfer coefficients at the main components used: evaporator, absorber, condenser, generator, desorper, resorber (P. Riesch, G. Alefeld, DKV-Tagungsberichte [Symposium Reports], Volume 17, Heidelberg, pp.569 ff (1990)). The absorber and resorber, in particular, require relatively large heat-exchange surfaces due to the poor mass transfer in absorption. In this case, turbulence in the solution is of great importance for thorough mixing of the solution and thus for the mass transfer and heat exchange in the absorber or resorber, just as in the case of boiling in the evaporator, generator or desorber. Turbulence in mass transfer and heat exchange is achieved by high energy exchange per unit area of heat exchanger, ie by high loads per unit area. Below, the generic term absorption heat exchanger is taken to mean diabatic, ie cooled absorbers and resorbers, such as trickle absorbers, also termed falling-film absorbers, equipped with, for example, tube-bundle or plate heat exchangers, immersion absorbers, also termed bubble absorbers, equipped with, for example, pipe-coil or plate heat exchangers, etc. (see, for example, Niebergall, W: Handbuch der Kältetechnik [Refrigeration Engineering Manual], Volume 7, Sorptionskältemaschinen [Sorption Refrigeration Machines], Springer Berlin N. Y., reprint (1981), pp. 379 ff).

It is known that the heat transfer in absorption heat exchangers may be enhanced, for example, by structured tubes (N. Isshiki, K. Ogawa, Proc. Munich Discussion Meeting on Absorption Heat Transfer Enhancement (1994)) or by additives, for example by Octanol (Y. Nagaoka et al., Proc. XVII Int. Congress of Refrigeration Vol.B. pp. 636, Vienna (1987)). A good discussion on heat transfer processes in absorbers is given in the subsequently published dissertation by F. Summerer (TU Munich, p.65, 1996). The heat transfer between solution and cooling medium does not generally limit the absorption process, however, this is limited by the mass transfer. A large heat exchange area in the absorber/resorber to improve the mass transfer by large surface area increases the costs of the absorber and creates wetting problems on the heat exchanger (J. Tang et al., 18th Int. Congress of Refrigeration, Montreal, p.519 (1991); I. Greiter, Dissertation TU Munich (1995), pp.36–37). Complete wetting of the heat exchanger is necessary for good heat transfer. In addition, for example with large heat-exchange areas or low input-heat temperatures and thus low energy exchange per unit of heat exchange area (load per unit area for short), the turbulence in the solution in the absorption heat exchanger and the effect of the additives which promote heat transfer decrease relatively sharply (K. J. Kim, Dissertation Arizona State University (1992), pp. 150). Low loads per unit area in the absorption heat exchanger also have an adverse effect on the loads per unit area in the other main components and can lead to relatively high specific heat exchange areas of the overall system and thus to high costs of the system.

It is further known, as already mentioned above, that, for example, the high exchange areas necessary at low input-heat temperatures in sorption systems having absorption heat exchangers, constructed, for example, as trickle absorbers, give rise to wetting problems. These problems are counteracted either with a decrease of the system efficiency by increasing the solution circulation rate between absorber and corresponding generator or else by recirculation at the absorber (H. v. Cube, F. Steimle: Wärmepumpen [heat pumps], VDI-Verlag Düsseldorf (1984), p.195). In the case of recirculation at the absorber, the solution which, on account of the absorption limited by mass transfer, exits subcooled at the collector of the absorption heat exchanger, is pumped back to the distributor apparatus of the absorption heat exchanger. In particular, sorption systems of medium and small capacity equipped with absorption heat exchangers having a low tube-bundle height require high recirculation for complete wetting. With respect to as high a temperature level as possible for decoupling the heat of absorption and for heat transfer at the absorption heat exchanger, high recirculation has an adverse effect, since the driving temperature difference available for the heat transfer is decreased by the temperature difference between weak and strong solution (I. Greiter, Dissertation TU Munich (1995), pp.36–37).

A further known measure uncouples mass transfer and heat exchange in absorbers/resorbers by using adiabatic absorbers (W. A. Ryan, Proc. mnt. Absorption Heat Pump Conference, New Orleans, AES-Vol. 31, p.155, 1994)). As a result, the high surface area required for the mass transfer can be provided without requiring high heat-exchange areas. The heat exchange is carried out separately in a cooler in the recirculation circuit. A disadvantage in the case of adiabatic absorbers is that the heat of absorption leads on mass transfer to a relatively severe heating of the solution in the absorber, since the specific heat of absorption is very high in comparison with the specific heat capacity of the solution. This requires a high recirculation rate and/or intense subcooling of the solution and thus a high driving temperature difference between cooling water and absorption temperature in the adiabatic absorber with all the associated disadvantages, such as high input-heat temperatures, loss of temperature elevation, etc. (F. Summerer, Dissertation, TU Munich, p.83, 1996).

The abovedescribed measures for enhancing the absorption have in common the fact that the highest possible surface areas are provided for the mass transfer limiting the absorption. This is achieved by high absorption heat exchanger areas, eg. as tube bundles, or in adiabatic absorbers, eg. by packings.

SUMMARY OF THE INVENTION

The object of the invention is, by enhancing the mass transfer and heat exchange in the absorber and/or resorber, to improve the performance characteristics of sorption systems by inexpensive measures.

According to the invention, the object is achieved according to this, for the sorption system, at least one cooled, that is non-adiabatic, absorption heat exchanger is used as absorber and/or resorber, with, as additional components, at least one solution cooler and a pump being connected into a recirculation circuit. The strong subcooled solution of working medium which exits at the absorption heat exchanger is recycled at least in part to the inlet of the absorption heat exchanger via at least one pump and at least one solution cooler. The arrangement according to the invention follows the concept of achieving a good mass transfer in the absorption heat exchanger by sharp subcooling of the solution. The high gradient, which can be achieved by this measure, between the vapour pressure, for example, of the absorbing trickling film in the absorption heat exchanger and the vapour pressure caused by the evaporator in the absorption heat exchanger promotes turbulence in the solution on absorption. The turbulence contributes to enhanced mixing of the solution in the absorption heat exchanger, in which both temperature gradients and concentration gradients occur superimposed. This has an advantageous effect on the mass transfer and heat exchange in the absorption heat exchanger and thus on the performance characteristics of the sorption system. The sharp subcooling of the solution at a given cooling water temperature is achieved by a solution cooler, eg. liquid/liquid heat exchanger, in the recirculation circuit. The k values of a solution cooler at up to 5000 W/m²K are markedly above those of an absorption heat exchanger having k values between 500 and 2000 W/m²K. In contrast to the abovementioned recirculation, the recirculation here does not serve principally to ensure wetting or partial load control, but the solution circuit primarily serves for the recirculation of the solution through the solution cooler and thus for subcooling the solution and for the more turbulent mass transfer and heat exchange in the absorption heat exchanger. The arrangement of absorption heat exchanger with solution cooler is a system which, by its interaction, achieves the enhancement in mass transfer and heat exchange on absorption in the absorption heat exchanger. The effect and the advantages which can be achieved do not simply arise from the sum of the action of the individual elements, solution cooler and absorption heat exchanger.

The interaction of absorption heat exchanger and solution cooler opens up, inter alia, the following technical possibilities and advantages, which would not be achievable without a solution cooler:

The expensive heat exchanger surfaces in the absorber/resorber, eg. tube-bundle heat exchanger, can according to this concept advantageously be made smaller, the solution cooler as a liquid/liquid heat exchanger is compact, highly efficient and inexpensive to manufacture, eg. as a plate heat exchanger.

Owing to the improved mass transfer and heat exchange, with conditions otherwise unchanged, the heat released on absorption can heat the cooling water to a higher temperature. This advantageously permits the flow of cooling medium through absorption heat exchanger and solution cooler to be reduced and/or the waste heat from the absorption heat exchanger and solution cooler to be given off at higher temperature, eg. for heating purposes.

As mentioned above, at a given capacity the cooling water temperature may be increased, which permits, for example under certain conditions, economic use of direct air cooling or dry recoolers.

In addition, pairs of materials can be used which, for example when absorption heat exchangers are used alone, have insufficient heat transfer, eg. owing to their high viscosity.

At a given cooling medium temperature, the vapour pressure in the absorber may be decreased, as a result of which the evaporator temperature for producing refrigeration may advantageously be decreased.

Similarly, the input-heat temperature in single- and multistage systems may be decreased owing to the high mass transfer and heat exchange in the absorption heat exchanger using a solution cooler. This enables, inter alia, efficient utilisation of low-temperature heat as driving heat, eg. waste heat or low-temperature heat from district heating, engines, solar collectors.

In the case of two-stage sorption refrigeration machines having a high efficiency, the input-heat temperature can be decreased to approximately 130° C. Hitherto, for example at this temperature, only single-stage sorption refrigeration machines could be operated economically. Owing to the possibility of operating even a two-stage sorption refrigeration system at high efficiency at 130° C., the coefficient of performance increases from 0.7 to 1.2, as a result of which the system can be used efficiently and advantageously even in low-pressure steam grids, for example.

According to the invention, in a three-stage sorption refrigeration machine, the input-heat temperature in the high-pressure generator can be decreased to approximately 150° C. with high efficiency. Previously, only two-stage refrigeration machines could be operated at this temperature. Increasing the temperature in the high-pressure generator to above 160° C. is not technically feasible because of unexplained questions with regard to corrosion inhibitors and material selection. Owing to the high coefficient of performance of 1.6 in the case of three-stage sorption refrigeration systems, these are, even in the case of direct firing with oil or gas, equivalent in terms of primary energy to compressor refrigeration systems.

The disadvantages of an absorber heat exchanger having a recirculation circuit which does not contain a solution cooler, or of an adiabatic absorber, are also markedly decreased and an advantageously low driving temperature difference in heat transfer is achieved. In particular, by combining solution cooler and absorption heat exchanger, the load per unit area of the absorption heat exchanger can advantageously be set in the system at a high value, which is in particular of critical advantage with respect to the low input-heat or refrigeration temperatures or high cooling-medium temperatures.

An advantageous embodiment of the invention is specified disposing the recirculation pump directly downstream of the absorption heat exchanger and upstream of the solution cooler makes a relatively high pressure drop possible at the solution cooler and thus turbulent flow of the solution in the solution cooler. As a result, the heat transfer at the solution cooler may advantageously be enhanced and the size of the solution cooler markedly decreased. Preferably, in the case of working media having a low vapour pressure, such as water for example, the solution cooler is disposed downstream of the recirculation pump, since, in contrast to this arrangement, good heat transfer can be achieved with high pressure drop in the solution cooler without the solution cavitating in the solution cooler.

A further advantageous embodiment of the invention is specified for example in the case of working media having a high vapour pressure: if the recirculation pump is disposed downstream of the solution cooler, firstly the solution can be subcooled for good mass transfer and heat exchange in the absorption heat exchanger, secondly this ensures that the solution does not cavitate owing to the pump suction. An advantage which may be mentioned is the reduction of the required suction head, or avoiding the use of relatively complex special pumps having so-called inducer apparatuses.

A combination is also advantageous: for example, a first solution cooler connects the suction side of the recirculation pump to the outlet of the absorption heat exchanger, a second having a relatively high pressure drop connects the pressure side of the pump to the intake of the absorption heat exchanger. This arrangement has both the advantage of low requirements of the recirculation pump and the advantage of a high heat transfer at the second solution cooler. Obviously, both solution coolers can also be implemented technically simply by a single heat exchanger having an appropriate number of passes of the solution cooler.

A further advantageous embodiment of the invention is specified the intake by the solution circuit pump of only slightly subcooled solution from the absorption heat exchanger customarily requires an appropriate suction head and a complex pump insensitive to cavitation. A partial stream having an inlet pressure far above the boiling pressure for feeding the solution circuit pump may advantageously be branched off from the recirculation pump used so that this solution circuit pump is no longer subject to any special requirements with respect to pump design. As a result, simple standard pumps, in particular having small inlet cross-sections, can be used as solution circuit pumps for the corresponding generator unit. On the other hand, advantageously, the recirculation pump acting as feed pump can also advantageously be combined together with the subsequent stages of the solution circuit pump in a pump housing.

A further advantageous embodiment of the invention is specified if the vapour pressure difference which is to be applied by the solution circuit pump does not exceed the pressure elevation of the recirculation pump, a separate solution circuit pump is not needed to transport the solution to the generator unit. This can be used advantageously, in particular, when working media having a low vapour pressure, such as water or alcohols, are employed.

A further advantageous embodiment of the invention is specified the hot or cold solution coming from the associated solution circuit must be fed to the absorber unit or resorber unit to maintain the absorption process. The pipe bearing the hot solution is advantageously connected to the inlet of the solution cooler. This means that the solution is efficiently cooled in the solution cooler because of its good heat transfer coefficient, before it is fed to the absorption heat exchanger. In the case of salty liquid absorption media, the concentrated hot solution from the generator unit which would otherwise crystallize on throttling or cooling can be depressurized or cooled by advantageously mixing it at the intake of the solution cooler with the solution from the outlet of the absorption heat exchanger. A control valve for throttling in the solution circuit between the outlet of the generator unit and the inlet of the solution cooler can be omitted. If working media having low vapour pressure, such as water, are used, it is advantageous to elevate the solution from the solution heat exchanger to the pressure level of the solution from the recirculation pump at the intake of the solution heat exchanger and admix it there via an additional solution pump, for example between generator and solution heat exchanger. Alternatively, the additional solution pump can also be omitted if the weak solution which flows from the generator through the solution heat exchanger is admixed to the solution from the absorption heat exchanger upstream of the recirculation pump.

If the cold solution, eg. from a desorber, from the solution circuit is sufficiently subcooled with respect to the pressure level of the resorber, the pipe bearing the cold solution is advantageously connected to the intake of the absorption heat exchanger serving as resorber.

A further advantageous embodiment of the invention is specified the recirculation circuit may be used as a control arrangement for the heat transfer coefficient in the absorption heat exchanger by, for example, the solution flow rate through the solution cooler being set appropriately using a recirculation pump. This means that the mass transfer and heat exchange in the absorption heat exchanger is controllable within broad limits. This may be used advantageously to match the system to seasonally varying cooling water temperatures, for example. The relative complex control of the cooling water flow stream temperature by admixture of return stream can thus be omitted.

A further advantageous embodiment of the invention is specified usually, the capacity of sorption systems is controlled via the temperature of the input heat, ie. for partial load the input-heat temperature is decreased. To enhance the partial load efficiency, in this case the solution circulation rate should be decreased as far as possible in proportion with the capacity. According to the invention, the recirculation circuit comprising a solution cooler is, due to the controllable mass transfer and heat exchange in the absorption heat exchanger, advantageously a control arrangement for the capacity of the system, the control being exercised, for example, via the setting of the cooling medium flow rate or solution flow rate through the solution cooler. This means that advantageously, firstly, the energy exchange of the system can be controlled and, secondly, even in the event of a solution circulation rate of virtually zero, complete wetting of the absorption heat exchanger is still ensured.

A further advantageous embodiment of the invention is specified owing to the efficient heat transfer by the solution cooler and absorption heat exchanger, only relatively small driving temperature differences are required at the absorber, and, therefore, even with a small driving temperature for heat transfer in other components, sufficient driving temperature differences are still available for flooded operation of generator, evaporator and desorber. The flooded heat exchangers, which are very simple and expedient in their technical construction, are therefore a particularly advantageous technical solution for the sorption system according to the invention.

A further advantageous embodiment of the invention is specified to increase the heat transfer coefficient for falling-film absorption heat exchangers, in many sorption systems additives such as 2-ethylhexanol are added which, at high loads per unit area, (=capacity/heat-exchange area) in the absorption heat exchanger, increase the heat transfer coefficient by several fold. As a low load per unit area, the improvement due to the additive drops sharply, however, and decreases to a value without additions of additive. The invention, for example, despite a reduction in the input-heat temperature, the load per unit area in the absorption heat exchanger is kept at a relatively high value, at which the action of the additives enhancing heat transfer is very largely retained. This permits the operation of sorption systems in temperature ranges for input-heat, useful heat, cooling medium or useful refrigeration, which was previously utilisable only with the use of correspondingly large and/or corrosion-resistant heat exchangers.

A further advantageous embodiment of the invention is specified salt-containing liquid absorbents frequently have the disadvantage that the maximum temperature difference between evaporation temperature and absorption temperature of the solution weak in working medium is limited either on account of the crystallization limit or due to high viscosities of the solution close to the crystallization limit. According to the invention, on account of the high recirculation via the solution cooler, only the strong concentration of working medium with advantageously minimum variation in salt content still occurs in the absorption heat exchanger. As an advantage, there results from this a high safety margin against crystallization in the absorption heat exchanger for operating points close to the crystallization limit. The recirculation flow rate can be set independently of the remaining process parameters of the associated solution circuit or of the entire system. It is also a decisive factor that for high-viscosity solutions close to the crystallization limit, relatively good mass transfer and heat exchange in the absorption heat exchanger or solution cooler are achieved. As a result, there is the possibility of setting the operating point of the absorber close to the crystallization limit and keeping the vapour pressure in the absorber to a minimum at a given cooling medium temperature and, in particular, for a narrow solution field.

A further advantageous embodiment of the invention is specified since air not saturated with water vapour is present as cooling medium at higher temperatures than evaporative cooling water at the corresponding external air conditions, in the case of dry cooling, the heat of absorption must be given off at a higher temperature level than in the case of evaporative cooling. On account of the mass transfer and heat exchange in the absorption heat exchanger enhanced by the solution cooler, at a given evaporator or generator temperature, the waste heat of the sorption system can be removed by the cooling medium at a higher temperature. This enables direct cooling of the condenser or resorber, absorber and solution cooler with dry air at input-heat temperatures, evaporation temperatures and air temperatures which would not be possible with efficiency without the arrangement according to the invention of absorption heat exchanger and solution cooler. In addition, in the case of salt-containing liquid absorbents having a narrow solution field, the absorption heat exchanger can be operated at temperature levels or concentrations of up to virtually the solidification limit. In the case of a water/lithium bromide sorption refrigeration machine, at an evaporation temperature of 5° C., the maximum available strong solution temperature is approximately 50° C. and thus the waste heat can still be transmitted particularly efficiently and advantageously to air with sufficient temperature differences in the solution cooler or absorption heat exchanger. Solution cooler, absorption heat exchanger and condenser can therefore be constructed as heat exchangers with dry air cooling.

Advantageously to cool the condenser and/or the absorption heat exchanger and/or the solution cooler, dry recoolers may also efficiently be used under conditions which would not permit an economical use of dry cooling without the arrangement according to the invention of absorption heat exchanger and solution cooler, as has already been described above for direct air cooling.

Combinations of direct and indirect air cooling according to the invention can also be particularly advantageous. For example, the solution cooler and the condenser can be directly cooled with air, in contrast, in the case of the absorption heat exchanger, designed as a standard trickling absorber, cooling is performed using cooling liquid which is cooled with air via a dry recooler.

The possibility, for example, of placing the operating point of the absorber close to the crystallization limit on account of the arrangement according to the invention, as explained above, advantageously permits LiBr/water absorption refrigeration systems, for example, to be used efficiently for ice production and brine cooling. Thus at an evaporator temperature of minus 5° C. in the evaporator, the absorber can be operated at a temperature of 35° C., which still permits efficient transfer of heat to cooling water.

The use of liquid-jet pumps as recirculation pumps can be advantageous, since, inter alia, jet pumps are substantially less expensive than electrically driven liquid pumps. The pressure difference of the solution, for example, between generator or solution heat exchanger outlet and absorber can be utilized as motive energy in order to use the solution stream from the generator as motive liquid stream for the jet pump. The suction liquid sent to the jet pump is the solution which exits at the outlet of the absorption heat exchanger and optionally flows through a solution cooler. By using the overpressure at the mixing nozzle in comparison with the pressure in the absorption heat exchanger, good heat transfer can advantageously be achieved in a solution cooler which is situated between mixing nozzles of the jet pump and absorption heat exchanger inlet. In the case of working media having a low vapour pressure, such as water, it can be necessary to generate the motive jet pressure using a solution pump, which is preferably arranged, for example, between generator and solution heat exchanger.

BRIEF DESCRIPTION OF THE DRAWINGS

The advantages which can be achieved are now explained with reference to the illustrative examples below. In the drawings, the invention is illustrated by way of example.

DETAILED DESCRIPTION OF THE PREFERRED EMBODIMENTS

Figure 1:
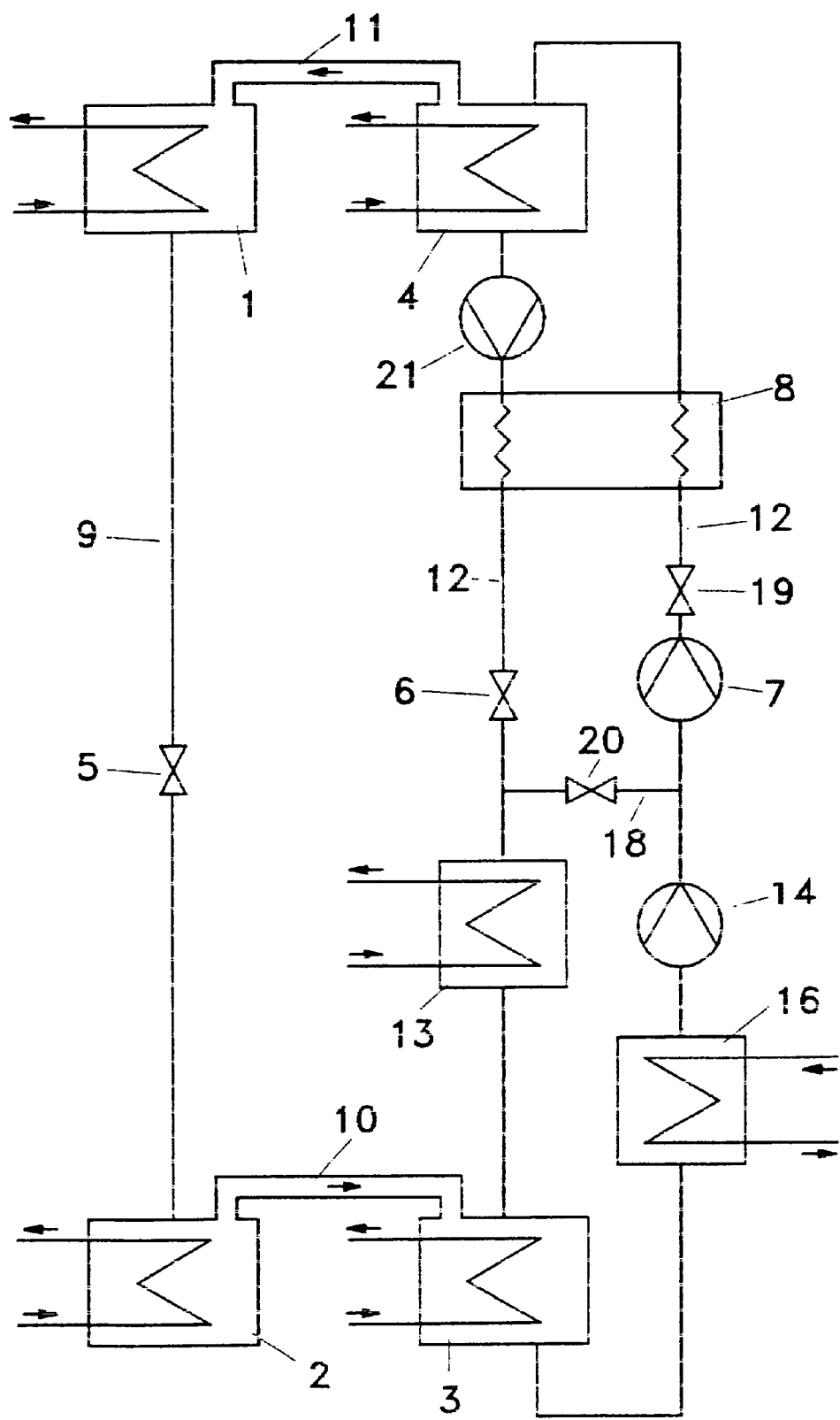
FIG. 1 diagrammatically shows a single-stage sorption system having the main components: condenser, evaporator, absorber and generator.

The structure of the sorption system according to the invention is now to be explained with reference to FIG. 1. As an example, a sorption system is shown having only one solution circuit 12 and the main components: condenser 1, evaporator 2, absorber constructed as a cooled absorption heat exchanger 3, and generator 4. The condenser 1 and the generator 4 are connected via a vapour line 11, and the evaporator 2 and the absorber 3 are connected via a vapour line 10, the working medium is conducted in line 9, and the solution in the solution circuit 12. There are also the working medium throttle 5, control valves 6 and 19, the solution circuit pump 7, solution heat exchanger 8 and an optionally present solution pump 21. Additional components then present according to the invention in the sorption system are, for example, two solution coolers 13/16 and a recirculation pump 14, a further control valve 20 and a connection line 18, which form a recirculation circuit around the absorption heat exchanger 3. Since the solution coolers 13 and 16, for example as liquid/liquid coolers having a high heat transfer coefficient, advantageously permit effective subcooling of the solution and thus require an advantageously low driving temperature difference for the heat transfer, the load per unit area, or the mass transfer and heat exchange, can be markedly increased by the recirculating strongly subcooled solution stream in the absorption heat exchanger 3, in comparison with arrangements without solution coolers (13/16), as explained above. The interaction of the solution cooler 13/16 and the absorption heat exchanger 3 thus leads to an enhancement of the mass transfer and heat exchange in the absorber 3. In this case the recirculation serves essentially not to ensure wetting in the absorption heat exchanger 3 or for control, but to recirculate the solution through the solution coolers 13/16 and thus to subcool the solution. The high load per unit area in the absorption heat exchanger 3 also advantageously leads indirectly to high loads per unit area in the generator 4 and evaporator 2 and thus to improvement of the performance characteristics of the sorption system. By the disposition according to the invention of solution cooler 13/16 and absorption heat exchanger 3 in FIG. 1, all the technical possibilities already listed above may be advantageously utilized.

Disposing the recirculation pump 14 upstream of the solution cooler 13, as shown in FIG. 1, can be advantageous, in order to generate a high pressure drop at the solution cooler 13 and thus to achieve turbulent flow in the solution cooler 13 which is advantageous for the heat transfer. The solution cooler 13 can therefore be constructed very compactly and inexpensively, with the solution cooler 16 then optionally being able to be omitted. In the case of working media having a low vapour pressure, such as water, this disposition with solution cooler 13 is preferred, since with a correspondingly high pressure drop at the solution cooler 16, the solution in the solution cooler 16 would cavitate.

A further advantageous embodiment is to place the solution cooler 16 upstream of the recirculation pump 14, e.g. in the case of working media having a high vapour pressure, in order firstly to cool the solution and secondly to ensure that the solution does not cavitate on suction. As a result, advantageously suction head to the pump 14 or technically complex inducer apparatuses in the pump 14 can be omitted.

The combination of a first solution cooler 16 on the suction side of pump 14 and a second solution cooler 13 having a relatively high pressure loss on the pressure side of the pump 14, as depicted in FIG. 1, is also advantageous. This arrangement makes few requirements of the recirculation pump 14, as explained above, and leads to a high heat transfer in the second solution cooler 13. Advantageously, both solution coolers 13 and 16 can be combined in one heat-exchanger shell having a corresponding number of passes.

Advantageously, the pump 14 can simultaneously also act as a feed pump for the solution circuit pump 7. Since the inlet pressure downstream of the pump 14 can be far above the boiling pressure of the solution, a partial stream may advantageously be used to feed the solution circuit pump 7, which is then not subject to any special requirements with respect to pump design, and in particular can have a small inlet cross-section. Advantageously, the recirculation pump 14 acting as a feed pump and the solution circuit pump 7 can be combined in one housing.

Depending on the pressures in the absorber 3 and generator 4, it can be advantageous to replace the recirculation pump 14 and the solution circuit pump 7 by a single pump, with the solution flow rate through the line 18 and in the solution circuit 12 being set at the outlet of the pump via the control valves 19 and 20. This solution suggests itself particularly in the case of small vapour pressure differences between absorber 3 and generator 4, as occur with the use of working media having a low vapour pressure in the sorption system, such as water or alcohols.

The hot weak solution of working medium coming from the generator 4, to maintain the absorption process in the absorber 3, is advantageously fed at the inlet of the solution cooler 13, as shown in FIG. 1. In this case it is expedient that the hot solution is already cooled in the solution cooler 13, which efficiently cools the solution on account of its good heat transfer coefficient as a liquid/liquid cooler, for example, before the solution is fed to the absorption heat exchanger 3. Mixing the hot very weak solution of working medium from the generator 4 with the solution from the absorption heat exchanger 3 via the line 18 has the advantage, in the case of salt-containing liquid absorption media, that crystallizing out of the salt from the solution on throttling and on subsequent further cooling of the solution in the solution cooler 13 is prevented. Advantageously, the control valve 6 can then be omitted or installed downstream of the solution cooler 13. In the case of working media having a low vapour pressure difference between generator 4 and absorber 3 it may be necessary to install the additional solution pump 21 between generator 4 and solution heat exchanger 8. As a result, the solution from generator 4 can be elevated to the same pressure at the inlet of the solution cooler 13 as the solution coming from the circulation pump 14 and at the same time good heat transfer can also be achieved in the solution heat exchanger 8. Alternatively, the solution pump 21 can be omitted if the weak solution of working medium coming from the solution heat exchanger 8 is admixed upstream of the recirculation pump 14 or at the inlet of the solution cooler 16.

In addition, the recirculation circuit comprising the solution coolers 13/16, the pump 14 and the control valve 20 forms a control arrangement for the heat transfer in the absorption heat exchanger 3. For example, by setting the cooling medium flow rate and/or the solution flow rate through the solution coolers 13/16, the load per unit area or the heat transfer in absorber 3 can be varied within wide limits. This can be utilized advantageously for adapting the system to fluctuating cooling water temperatures in the absorber 3 and solution coolers 13/16. A relatively complex control of the cooling water flow stream temperature by return stream admixture in the absorber 3 can thus be omitted.

The recirculation circuit comprising the solution coolers 13/16, the recirculation pump 14 and the control valve 19 and 20 can also be a control arrangement for the capacity of the system. As mentioned, by setting the flow rate of solution or cooling medium through the solution coolers 13/16, advantageously, on the one hand, the energy exchange of the system may be set, but, on the other hand, even at a solution circulation rate in the circuit 12 of virtually zero, complete wetting of the absorption heat exchanger 3 may still be ensured.

On account of the efficient mass transfer and heat exchange by solution coolers 13/16 and absorption heat exchanger 3 in a plant according to the illustrative example in FIG. 1, only relatively small driving temperature differences are required. Therefore, even at a low input-heat temperature, for heat transfer in the other components condenser 1, evaporator 2 and generator 4, there are still sufficiently high driving temperature differences available for a flooded generator heat exchanger 4 or evaporator heat exchanger 2. The flooded heat exchangers 2 and 4 which are very simple and expedient in their technical construction therefore form a particularly advantageous technical solution for the sorption system according to the invention.

A further advantage of a system according to illustrative Example 1 arises in combination with additives for increasing the heat transfer coefficient for an absorber 3 as falling-film absorption heat exchanger, such as 2-ethylhexanol, which, at high loads per unit area, increase the heat transfer coefficient by several fold, but at low load per unit area have only a very small or no effect. According to the invention, by the arrangement in FIG. 1, for example, despite a reduction of the input-heat temperature at the generator 4, the load per unit area in the absorption heat exchanger 3 is kept at a relatively high value, at which the effect of the additives enhancing heat transfer is advantageously optimally retained. This allows the operation of sorption systems in temperature ranges for the input heat, useful heat, cooling medium or useful refrigeration, which was hitherto achievable only with the use of correspondingly large and/or corrosion-resistant heat exchangers.

When salt-containing liquid absorption media are used in the solution circuit 12 in a system according to FIG. 1, the maximum temperature difference between evaporation temperature in the evaporator 2 and absorption temperature in the absorber 3 of the weak solution of working medium can advantageously be prevented from being limited on account of the crystallization limit or by high viscosities. According to the invention, in such a system only strong concentrations of working medium with minimum variation in salt content occur in the absorption heat exchanger 3 on account of the adjustable solution flow rate via the circulation pump 14. As an advantage, there arises therefrom a high safety margin against crystallization in the absorption heat exchanger 3. The high recirculation flow rate through the solution coolers 13/16 can be controlled stably independently of the remaining process parameters in the solution circuit 12 or the total system. In particular, close to the crystallization limit at which solutions become highly viscous and therefore have a poor heat transfer in the absorption heat exchanger 3, good mass transfer and heat exchange are achieved by the disposition according to the invention of absorption heat exchanger 3 and solution cooler 13/16. Thus, for example, LiBr/water sorption refrigeration systems can be used efficiently for brine cooling and ice production. For example, for an evaporator temperature of minus 5° C. in the evaporator 2, the maximum available temperature of strong solution of working medium can still be 35° C., which, for the abovementioned reasons, can be efficiently transferred to cooling water.

The invention also permits the range of use of cooling with dry air in sorption systems to be expanded, on account of the abovementioned enhanced heat transfer to the cooling medium, in this case, the condenser 1 and/or the absorption heat exchanger 3 and/or the solution coolers 13/16 being constructed as heat exchangers having the cooling medium dry air. For the abovementioned reasons, the operating point of the absorption heat exchanger 3 can in the case of salt-containing liquid absorption media advantageously be close to the solidification limit of the solution which, as mentioned, expands the economic range of use of sorption refrigeration systems having direct and indirect air cooling. For example, in the case of a sorption refrigeration machine for the material combination LiBr/water at an evaporation temperature of 5° C. in the evaporator 2, the maximum available temperature of strong solution of working medium is approximately 50° C. in the absorber 3. The heat to be removed from the condenser and absorber can still be transferred directly or indirectly to air efficiently and advantageously at sufficient temperature differences, even at salt concentrations at which the solution is highly viscous, by the disposition according to the invention of solution coolers 13/16 and absorption heat exchanger 3. Advantageously, for cooling, for example the solution cooler 13/16 and the absorption heat exchanger 3, a dry recooler can be used under conditions at which efficient dry cooling would not be possible without solution coolers 13/16.

Figure 2A:
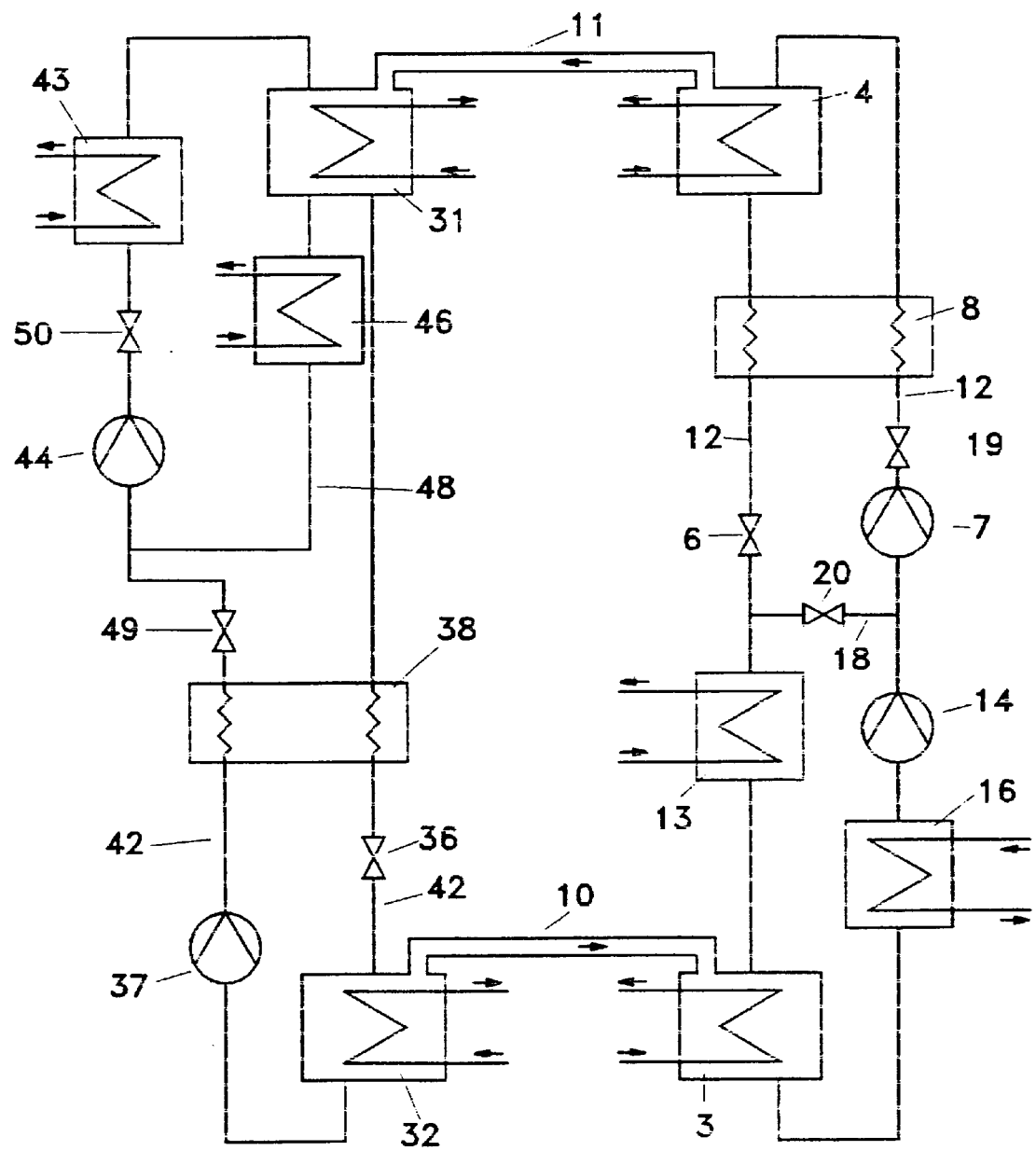
FIG. 2a diagrammatically shows a single-stage sorption system having the main components: resorber, desorber, absorber and generator.

A further illustrative example of the sorption system according to the invention is shown by the resorption refrigeration machine depicted in FIG. 2a. Instead of the condenser 1 and the evaporator 2, the system has a resorber constructed as an absorption heat exchanger 31, and a desorber 32, as well as a further solution circuit 42, solution heat exchanger 38, solution circuit pump 37 and control valves 36 and 49. Advantageously, not only does the system possess at the absorber 3 an arrangement according to the invention of absorption heat exchanger 3 and solution cooler 13/16, as explained in the illustrative example according to FIG. 1, but the resorber as absorption heat exchanger 31, together with the solution coolers 43 and 46, the line 48, the pump 44 and the control valve 50, also forms a recirculation circuit. The same advantages according to the invention arise as for the recirculation circuit at the absorber 3 which were explained in the first illustrative example according to FIG. 1.

In a single-stage system, the pump 44 cannot be used as a feed pump for the solution circuit pump 37, nor can the pumps 37 and 44 be designed as one pump, as is advantageously possible for the pumps 7 and 14. In multistage plants, in contrast, it is advantageously possible to use the pump 44 feed pump or solution circuit pump to the downstream stage thereabove. It is advantageous to connect both at the absorber 3 and at the resorber 31 a recirculation circuit of solution coolers 13/16 and 43/46, respectively, and pumps 14 and 44, respectively, since both each additively decrease the input-heat temperature of the generator 4 as explained in FIG. 3a. In the case of resorption heat transformers or multistage resorption refrigeration machines, it is further advantageous to feed hot solution flowing from the higher pressure or temperature level at the inlet of the solution cooler 43, since the heat is effectively removed in the solution cooler 43.

Figure 2B:
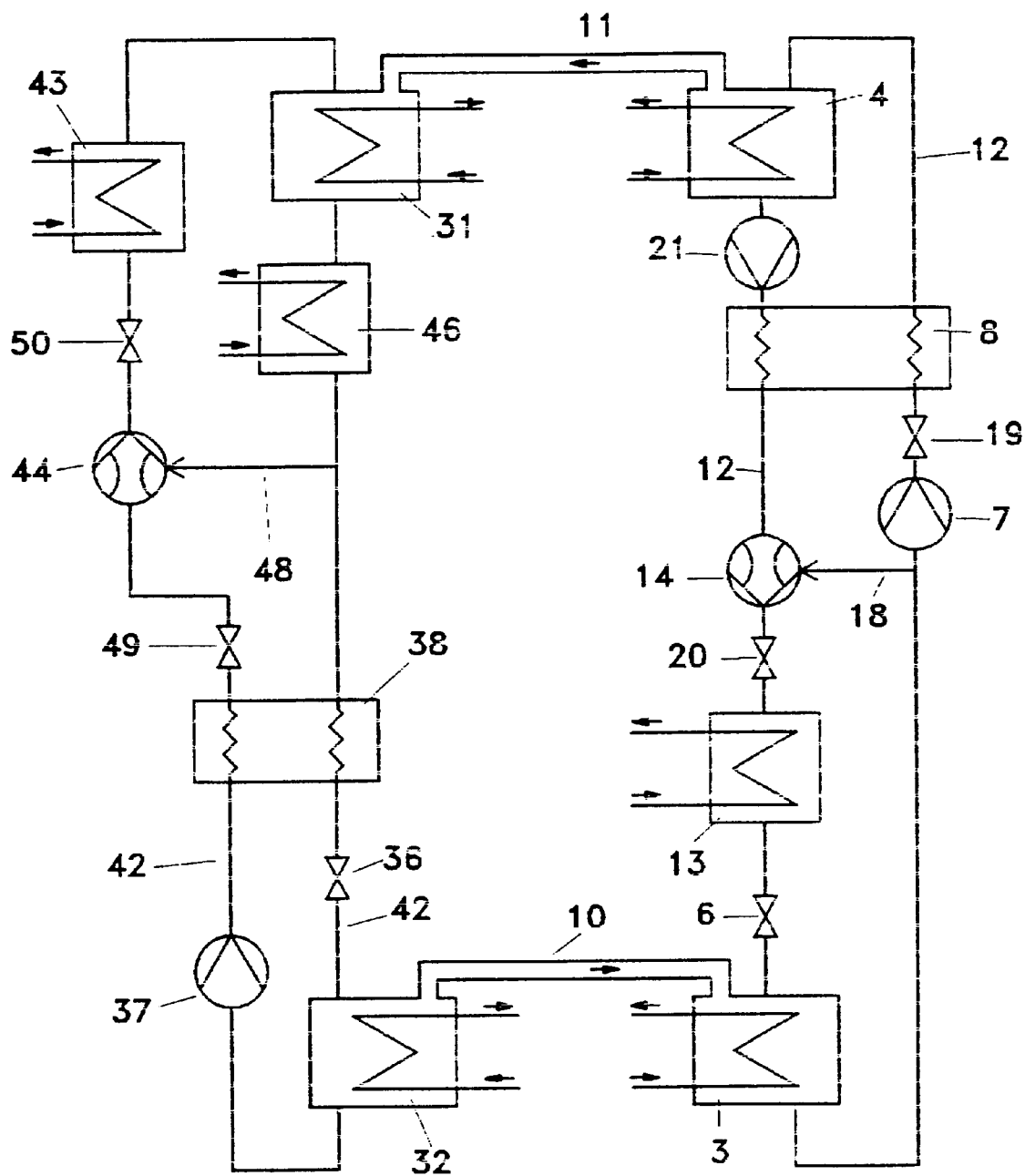
FIG. 2b diagrammatically shows a single-stage sorption system having a resorber, desorber, absorber and generator, and two liquid-jet pumps as recirculation pumps.

FIG. 2b shows a similar sorption system as FIG. 2a with the essential difference that the mechanical solution pumps 14 and 44 are replaced by liquid-jet pumps 14 and 44, respectively. The motive liquid for the jet pumps 14 and 44 is the solution from the generator 4 in the solution circuit 12, or the solution in the solution circuit 42 which is brought to a corresponding pressure by pump 37. In the case of the jet pump 14, therefore, the pressure difference of the solution between generator 4 and absorber 3 is utilized, which is sufficiently large in the case of ammonia/water sorption systems, for example. With material combinations having a small pressure difference between generator 4 and absorber 3, e.g. LiBr/water, good heat transfer in the solution heat exchanger 8 is achieved using a solution pump 21 between generator 4 and solution heat exchanger 8. The solution pump 21 can advantageously be designed in such a manner that, in addition to the pressure drop in the solution heat exchanger 8, it also supplies sufficient pressure for the motive liquid of the jet pump 14. On the suction side of the jet pump 14 and 44, solution is fed from the outlet of the absorption heat exchanger 3 or of the solution cooler 46, respectively. At the mixture outlet of the jet pump 14 or 44, the overpressure in comparison with the pressure in the absorption heat exchanger 3 or 31, respectively, can be utilized to achieve good heat transfer in the solution cooler 13 or 43. A solution pump in the recirculation circuit, which is expensive in comparison with the jet pump 14 or 44, can be omitted.

Figure 3A:
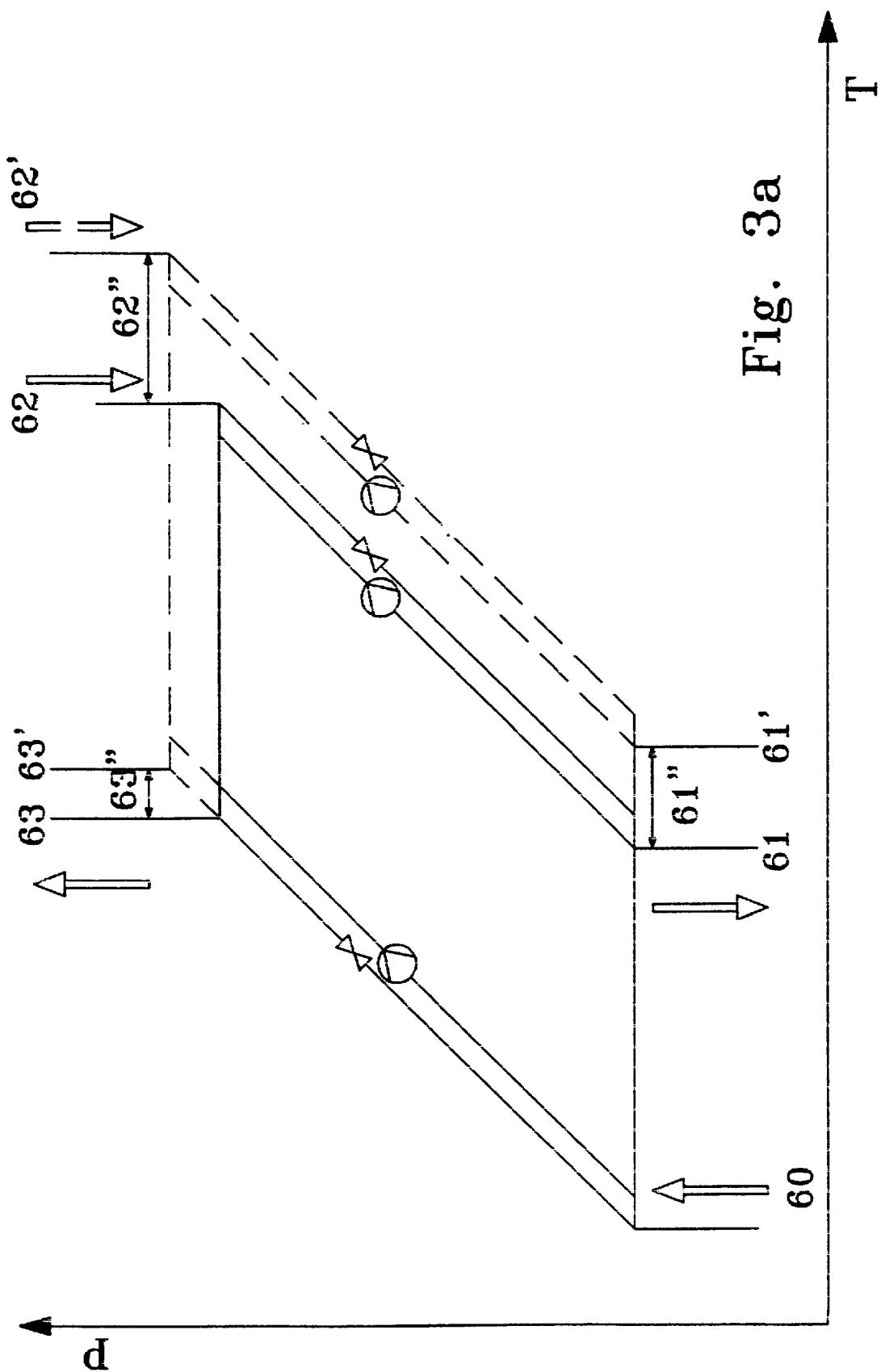
FIG. 3a–c shows pressure-temperature diagrams for single- and multistage systems.
Figure 3B:
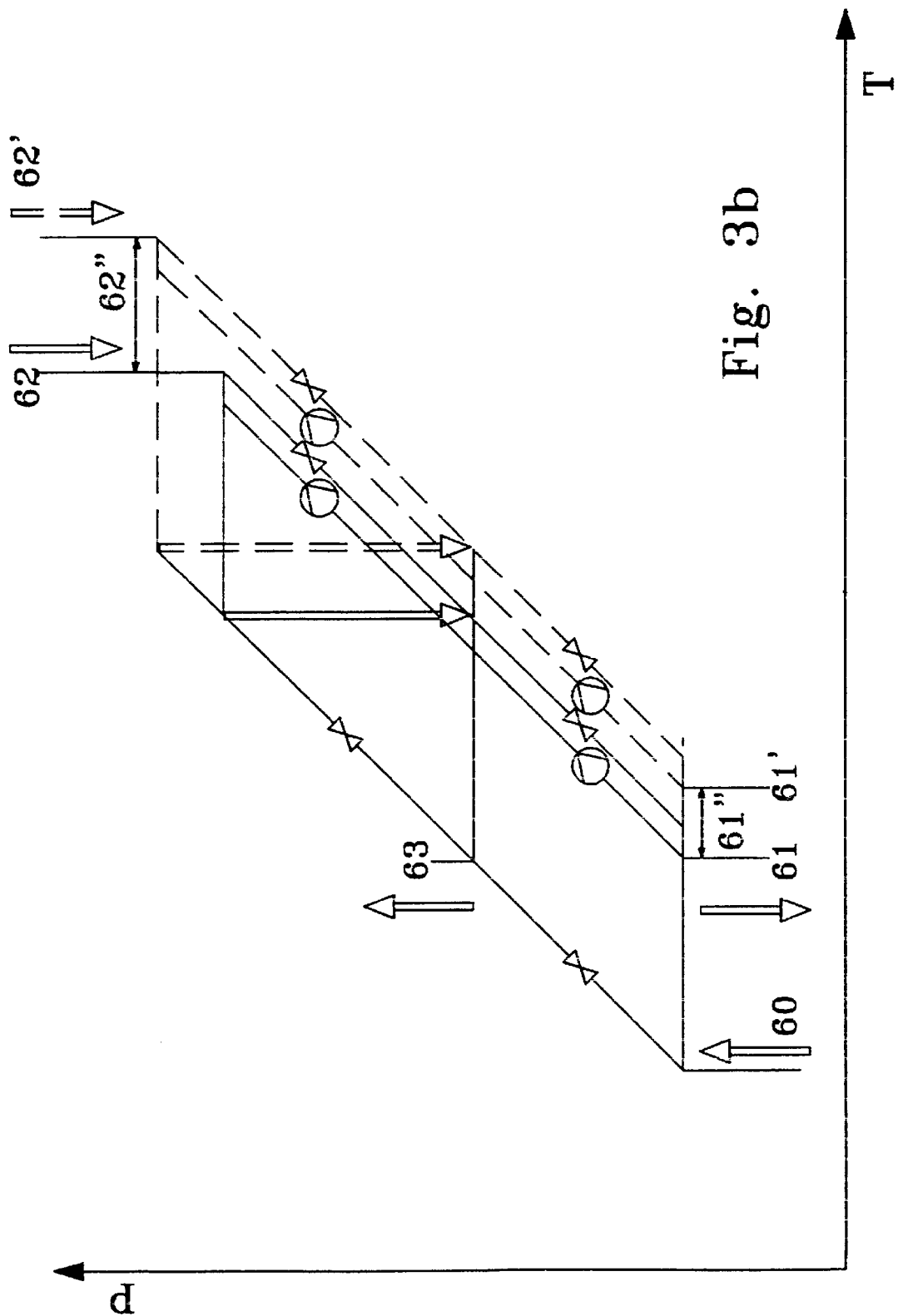
Figure 3C:
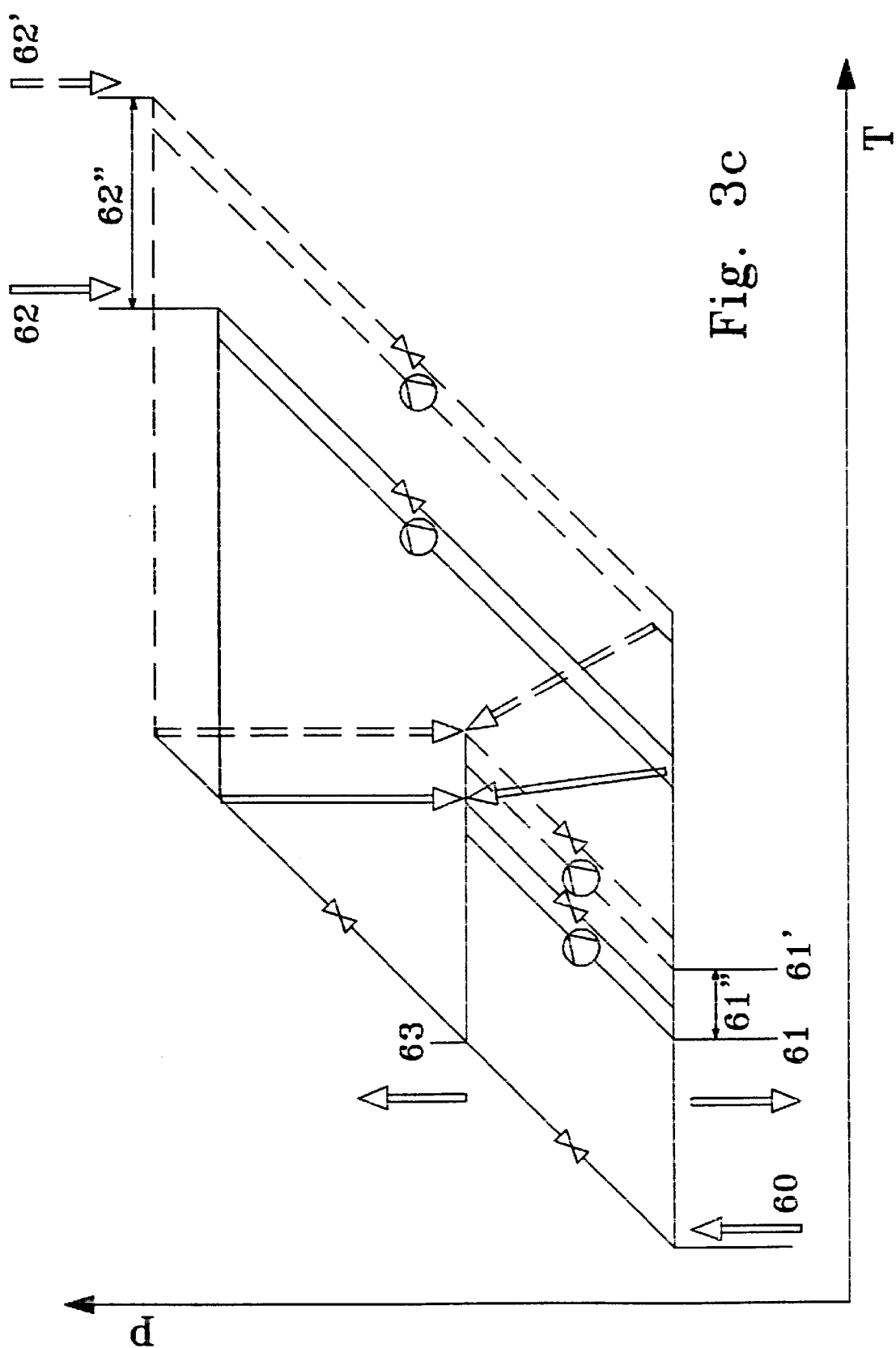
Figure 4:
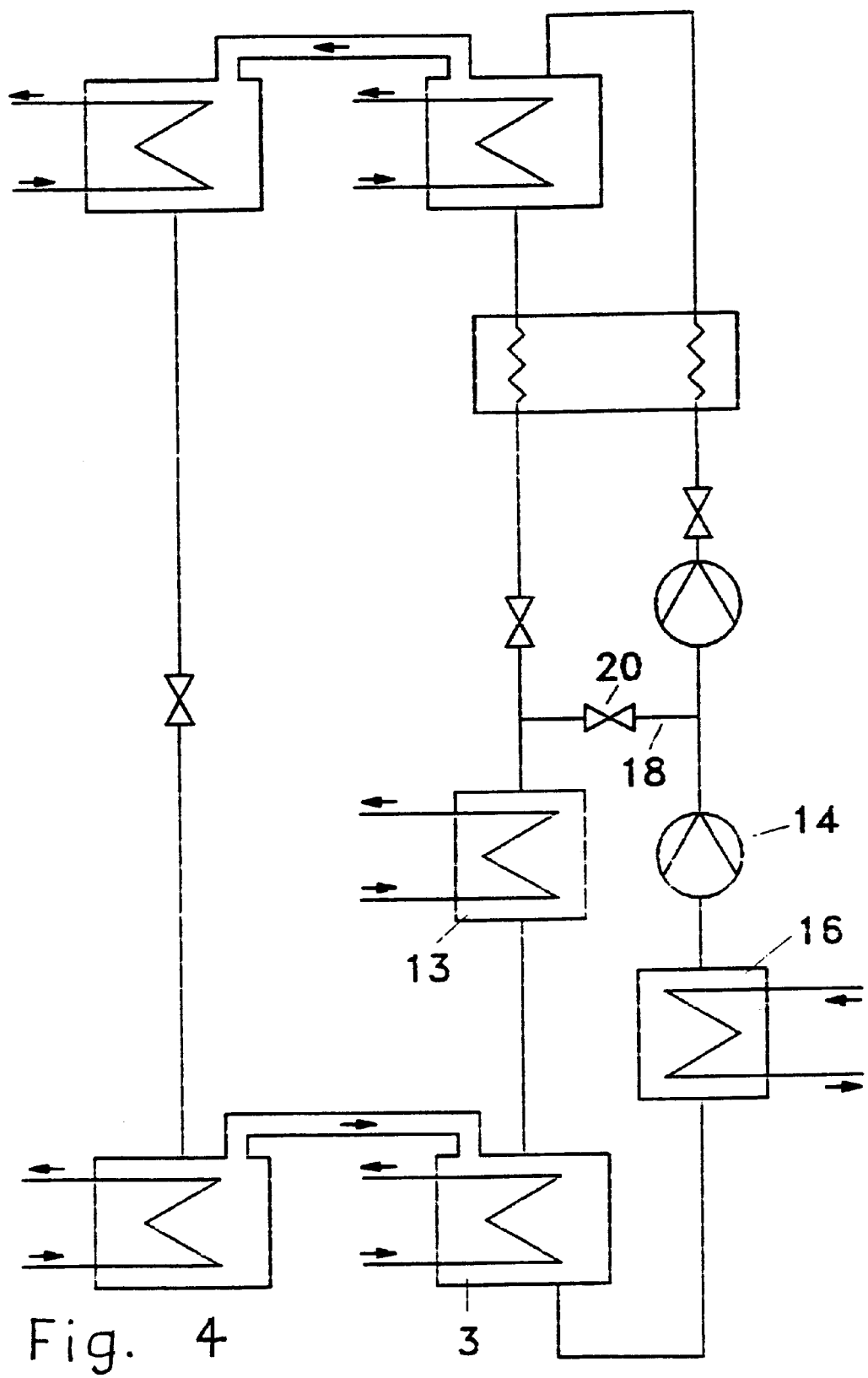
FIG. 4 diagrammatically shows a single-stage sorption system having the main components: condenser, evaporator, absorber and generator without an additional solution pump.

On the basis of the pressure-temperature diagrams in FIGS. 3a–c, the advantages of the invention are shown as examples with respect to the temperature levels of the heat quantities converted for single- and multistage sorption refrigeration machines. The arrows indicate the temperature levels and show whether heat quantities are supplied or removed. For a single-stage resorption refrigeration machine in FIG. 3a, the heat quantities supplied at the desorber and at the generator are designated 60 and 62 and 62', respectively, and the internal process temperatures of the heat quantities removed at the absorber and resorber are designated 61 and 61', and 63 and 63', respectively. Without a recirculation circuit comprising a solution cooler, the heat quantities are supplied at the generator at the temperature at 62', and are removed at the internal process temperature of 61' at the absorber and 63' at the resorber. By means of the additional solution coolers according to the invention in the recirculation circuits, the internal process temperatures of the heat quantities removed at 61 and 63 advantageously shift to lower internal process temperatures, and thus the input heat also shifts to a temperature at 62 at the generator on account of the enhanced heat transfer coefficients in the resorber and absorber. The temperature shift at the generator, which is designated 62", is advantageously additively composed from the shifts at the absorber 61" and at the resorber 63". If, in contrast, the input-heat temperature is left at the original value at 62', the capacity of the entire system increases. That is, capacities converted to per unit of heat exchange area also increase accordingly at the evaporator and generator, as a result of which their heat transfer coefficient likewise increases. In contrast, if the system capacity remains constant, optionally, the temperature of the required input heat 62 or 62' or of the available refrigeration capacity 60 at desorber or evaporator, may be decreased. Correspondingly, for the single-stage heat transformer, the advantageous use of the solution cooler at the diabatic absorber or resorber optionally decreases the required input-heat temperature or cooling water temperature or else increases the available load temperature. The advantages explained for the single-stage systems with the use of at least one absorption heat exchanger having a solution cooler are also correspondingly achieved in multistage systems as described as examples below with reference to FIGS. 3b and 3c.

An example of an advantageous use of the invention in a two-stage sorption refrigeration machine having high efficiency is represented in the pressure-temperature diagram in FIG. 3b. In this sorption refrigeration machine, the input heat is supplied at a higher temperature, 62 and 62', in comparison with the single-stage system, and is used in the system twice in succession to strip the solution, as a result of which the coefficient of performance is increased to approximately 1.2. For example, the internal process temperature to decouple the absorber heat 61' at the absorber is already decreased by 61" to the internal process temperature at 61 by only one absorption heat exchanger having an additional solution cooler according to the invention, and, in consequence, the required input-heat temperature for this two-stage sorption and resorption refrigeration machine is decreased by at least approximately twice 61", that is approximately equal to 62", from the temperature at 62' to that at 62. According to the invention this advantageously makes possible, for example, driving two-stage absorption refrigeration machines having high efficiency by low-pressure steam grids at approximately 130° C. Optionally, just as with a single-stage system with input-heat and useful refrigeration temperatures otherwise unchanged, the temperature of the cooling medium for heat removal from condenser or absorber can be elevated, so that it is possible to cool the system with dry air without consuming cooling water.

In the pressure-temperature diagram in FIG. 3c, a three-stage sorption refrigeration machine having high efficiency is represented. By still further increasing the input-heat temperature, the coefficient of performance of the sorption refrigeration machine is increased in comparison with the two-stage system from 1.2 to approximately 1.5. Here, for example by an absorption heat exchanger having a solution cooler at the absorber, the internal process temperature for decoupling the absorber heat 61 is decreased by 61" from the temperature at 61' and in consequence the required generator temperature at 62 in the high-temperature generator of these systems is already decreased by approximately twice 61". A further decrease of this temperature by in total 62", that corresponds to approximately three times 61", can be achieved by adding a further recirculation circuit according to the invention at the high-temperature absorber. According to the invention, this opens up the possibility, even for three-stage sorption or resorption machines, of keeping the generator temperature at 62 below the known corrosion limit temperature of approximately 150 to 160° C. and thus makes possible sustained operation of this type of system

What is claimed is:

1. Heat absorption conversion system, such as a heat pump, refrigeration system or heat transformer, comprising:
   at least one absorber and/or resorber, constructed as at least one cooled absorption heat exchanger, and
   a recirculation circuit having at least one solution cooler and at least one recirculation pump formed around at least one cooled absorption heat exchanger,
   wherein at least one recirculation pump is connected between an inlet of at least one absorption heat exchanger and an outlet of at least one solution cooler.

2. Heat absorption conversion system, such as a heat pump, refrigeration system or heat transformer, comprising:
   at least one absorber and/or resorber, constructed as at least one cooled absorption heat exchanger, and
   a recirculation circuit having at least one solution cooler and at least one recirculation pump formed around at least one cooled absorption heat exchanger,
   wherein at least one recirculation pump is one of a feed pump and a first stage for a downstream solution circuit pump.

3. Heat absorption conversion system according to claim 2, characterized in that at least one recirculation pump is at the same time a solution circuit pump.

4. Heat absorption conversion system according to claim 3, characterized in that a line for hot or cold solution from a solution circuit is connected to one of an inlet of at least one solution cooler and the inlet of at least one absorption heat exhanger.

5. Heat absorption conversion system according to claim 3, characterized in that at least one recirculation pump and/or at least one solution cooler is a control arrangement for heat transfer in at least one absorption heat exchanger.

6. Heat absorption conversion system according to claim 1, characterized in that the recirculation circuit is a control arrangement for a capacity of the system.

7. Heat absorption conversion system according to claim 3, further comprising at least one evaporator and/or one generator and/or one desorber constructed as a flooded heat exchanger.

8. Heat absorption conversion system according to claim 2, characterized in that additives which increase the heat transfer are present in at least one absorption heat exchanger.

9. Heat absorption conversion system according to claim 1, characterized in that salt-containing liquid absorption media are present in the system.

10. Heat absorption conversion system, such as a heat pump, refrigeration system or heat transformer, comprising:
- at least one absorber and/or resorber, constructed as at least one cooled absorption heat exchanger, and
- a recirculation circuit having at least one solution cooler and at least one recirculation pump formed around at least one cooled absorption heat exchanger,
- wherein heat exchanger(s) of at least one condenser and/or of at least one absorption heat exchanger and/or of at least one solution cooler is/are constructed for cooling with air.

11. Heat absorption conversion system, such as a heat pump, refrigeration system or heat transformer, comprising:
- at least one absorber and/or resorber, constructed as at least one cooled absorption heat exchanger, and
- a recirculation circuit having at least one solution cooler and at least one recirculation pump formed around at least one cooled absorption heat exchanger,
- wherein cooling medium connections of at least one condenser and/or at least one absorption heat exchanger and/or at least one solution cooler are connected to cooling medium connections of at least one dry recooler.

12. Heat absorption conversion system, such as a heat pump, refrigeration system or heat transformer, comprising:
- at least one absorber and/or resorber, constructed as at least one cooled absorption heat exchanger, an
- a recirculation circuit having at least one solution cooler and at least one recirculation pump formed around at least one cooled absorption heat exchanger,
- wherein the system is a sorption refrigeration system for ice production and/or brine cooling.

13. Heat absorption conversion system, such as a heat pump, refrigeration system or heat transformer, comprising:
- at least one absorber and/or resorber, constructed as at least one cooled absorption heat exchanger,
- a recirculation circuit having at least one solution cooler and at least one recirculation pump formed around at least one cooled absorption heat exchanger, wherein at least one recirculation pump is constructed as a liquid-jet pump,
- a motive-medium connection having a connection to a solution circuit,
- a suction nozzle having a connection to the recirculation circuit via a connection line, and
- a mixing nozzle having a connection to one of an inlet of at least one solution cooler and an inlet of at least one absorption heat exchanger.

14. Heat absorption conversion system according to claim 3, wherein at least one recirculation pump is one of a feed pump and a first stage for a downstream solution circuit pump.

15. Heat absorption conversion system according to claim 1, characterized in that at least one recirculation pump is at the same time a solution circuit pump.

* * * * *